US010311829B2

(12) United States Patent
Tamegai

(10) Patent No.: US 10,311,829 B2
(45) Date of Patent: Jun. 4, 2019

(54) ELECTRONIC APPARATUS, CONTROL METHOD, AND RECORDING MEDIUM

(71) Applicant: KYOCERA CORPORATION, Kyoto (JP)

(72) Inventor: Atsushi Tamegai, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 9 days.

(21) Appl. No.: 15/413,098

(22) Filed: Jan. 23, 2017

(65) Prior Publication Data

US 2017/0213525 A1    Jul. 27, 2017

(30) Foreign Application Priority Data

Jan. 26, 2016   (JP) ................................. 2016-012701

(51) Int. Cl.
| | | |
|---|---|---|
| *G09G 5/10* | (2006.01) | |
| *H04W 4/02* | (2018.01) | |
| *G09G 5/00* | (2006.01) | |
| *G06F 1/16* | (2006.01) | |
| *G06F 3/147* | (2006.01) | |

(Continued)

(52) U.S. Cl.
CPC .............. *G09G 5/10* (2013.01); *G06F 1/1656* (2013.01); *G06F 3/147* (2013.01); *G09G 5/006* (2013.01); *H04W 4/02* (2013.01); *G06F 3/011* (2013.01); *G06F 3/0346* (2013.01); *G06F 3/042* (2013.01); *G06F 3/043* (2013.01); *G06F 3/044* (2013.01); *G06F 3/0414* (2013.01);
(Continued)

(58) Field of Classification Search
CPC .... G09G 5/10; G09G 5/006; G09G 2360/144; G09G 2320/0626; G09G 2370/04; H04W 4/02; G06F 3/011; G06F 3/0346; G06F 3/0414; G06F 3/042; G06F 3/043; G06F 3/044
See application file for complete search history.

(56) References Cited

U.S. PATENT DOCUMENTS

| | | | | |
|---|---|---|---|---|
| 2004/0003958 | A1* | 1/2004 | Fujimoto | ............. G01S 7/6218 181/124 |
| 2011/0105100 | A1* | 5/2011 | Tanaka | ................. H01H 13/702 455/418 |
| 2015/0382305 | A1* | 12/2015 | Drincic | ............. H04W 52/0209 455/574 |

FOREIGN PATENT DOCUMENTS

JP           2013-121007          6/2013

OTHER PUBLICATIONS

JP 2013-121007A (Machine Translation on Jun. 17, 2013).*
JP 2014-103690A (Machine Translation on Jun. 5, 2014).*

* cited by examiner

*Primary Examiner* — Mark K Zimmerman
*Assistant Examiner* — Michael Le
(74) *Attorney, Agent, or Firm* — Duane Morris LLP

(57) ABSTRACT

An electronic apparatus is disclosed. A display is configured to be able to change brightness of the display. A water detector is configured to detect water. A communication unit is configured to be able to communicate with another electronic apparatus. At least one processor is configured to, when the at least one processor detects, using the water detector, that at least part of the electronic apparatus is located in the water and detects, using the communication unit, that the another electronic apparatus is not located in the water, brighten the display compared with that when the at least one processor detects, using the water detector, that the at least the part of the electronic apparatus is located in (Continued)

the water and at least part of the another electronic apparatus is located in the water.

11 Claims, 10 Drawing Sheets

(51) Int. Cl.
*G06F 3/01* (2006.01)
*G06F 3/0346* (2013.01)
*G06F 3/041* (2006.01)
*G06F 3/042* (2006.01)
*G06F 3/043* (2006.01)
*G06F 3/044* (2006.01)

(52) U.S. Cl.
CPC ............... *G09G 2320/0626* (2013.01); *G09G 2360/144* (2013.01); *G09G 2370/04* (2013.01)

F I G. 4
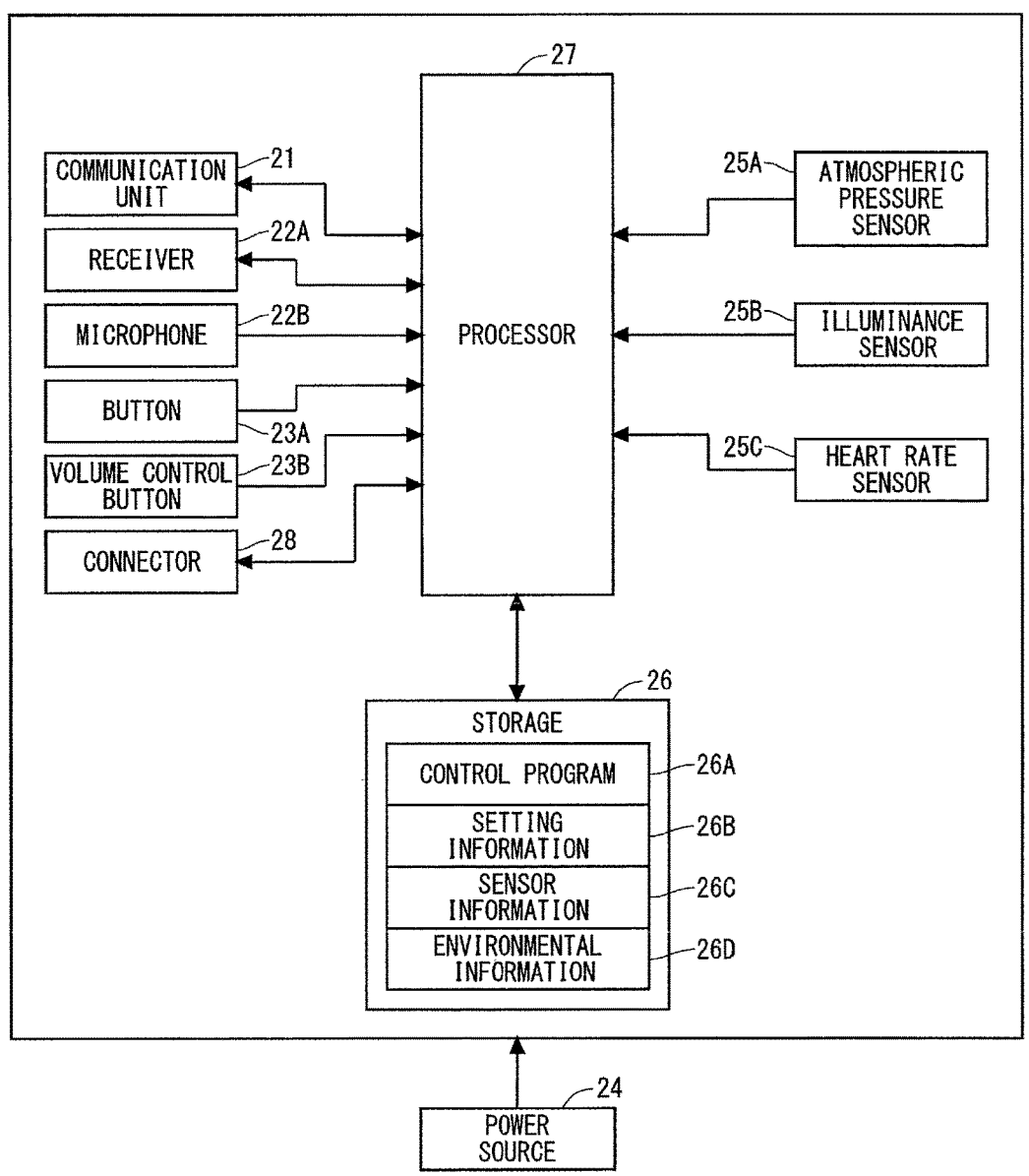

F I G. 8
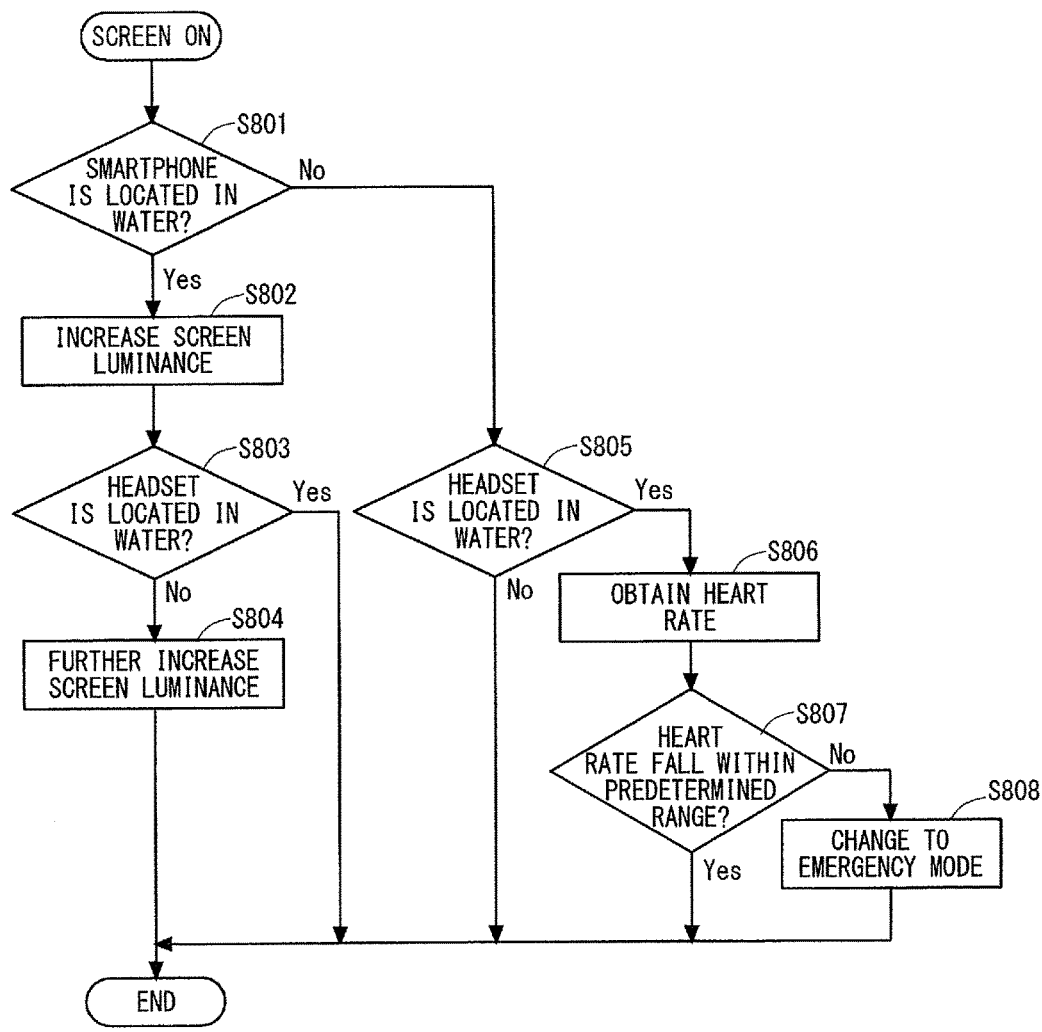

ELECTRONIC APPARATUS, CONTROL METHOD, AND RECORDING MEDIUM

CROSS-REFERENCE TO RELATED APPLICATION

The present application claims priority under 35 U.S.C. § 119 to Japanese Patent Application No. 2016-012701, filed on Jan. 26, 2016, entitled "ELECTRONIC APPARATUS, CONTROL METHOD, AND CONTROL PROGRAM". The content of which is incorporated by reference herein in its entirety.

FIELD

Embodiments of the present disclosure relate to an electronic apparatus.

BACKGROUND

Conventionally, there is an electronic apparatus which changes a display mode of information displayed on a display surface when the electronic apparatus detects water on the display surface.

SUMMARY

An electronic apparatus is disclosed. In one embodiment, an electronic apparatus comprises a display, a water detector, a communication unit, and at least one processor. The display is configured to be able to change brightness of the display. The water detector is configured to detect water. The communication unit is configured to be able to communicate with another electronic apparatus. The at least one processor is configured to, when the at least one processor detects, using the water detector, that at least part of the electronic apparatus is located in the water and detects, using the communication unit, that the another electronic apparatus is not located in the water, brighten the display compared with that when the at least one processor detects, using the water detector, that the at least the part of the electronic apparatus is located in the water and at least part of the another electronic apparatus is located in the water.

An electronic apparatus is configured to be attached near a head of a user and be able to communicate with another electronic apparatus. The electronic apparatus comprises a water detector. The water detector is configured to detect water. The electronic apparatus is configured to transmit information obtained by the water detector to the another electronic apparatus.

An electronic apparatus executes a control method. The electronic apparatus comprises a display, a water detector, and a communication unit. The display is configured to be able to change brightness of the display. The water detector is configured to detect water. The communication unit is configured to be able to communicate with another electronic apparatus. The control method comprises a first step and a second step. In the first step, it is detected, using the water detector, that at least part of the electronic apparatus is located in the water and, using the communication unit, that the another electronic apparatus is not located in the water. In the second step, after the first step, the display is brightened compared with that when it is detected, using the water detector, that the at least the part of the electronic apparatus is located in the water and at least part of the another electronic apparatus is located in the water.

A non-transitory computer readable recording medium stores a control program. The control program controls an electronic apparatus. The electronic apparatus comprises a display, a water detector, and a communication unit. The display is configured to be able to change brightness of the display. The water detector is configured to detect water. The communication unit is configured to be able to communicate with another electronic apparatus. The electronic apparatus executes a first step and a second step. In the first step, it is detected, using the water detector, that at least part of the electronic apparatus is located in the water and, using the communication unit, that the another electronic apparatus is not located in the water. In the second step, after the first step, the display is brightened compared with that when it is detected, using the water detector, that the at least the part of the electronic apparatus is located in the water and at least part of the another electronic apparatus is located in the water.

BRIEF DESCRIPTION OF THE DRAWINGS

FIG. 4 is a block diagram showing a function configuration of a headset according to an embodiment.

FIG. 8 is a flow chart showing a processing flow according to an embodiment.

DETAILED DESCRIPTION

Embodiments of an electronic apparatus are described in detail with reference to drawings. A smartphone 1 and a headset 20 are described as an example of the electronic apparatus hereinafter.

Figure 1:
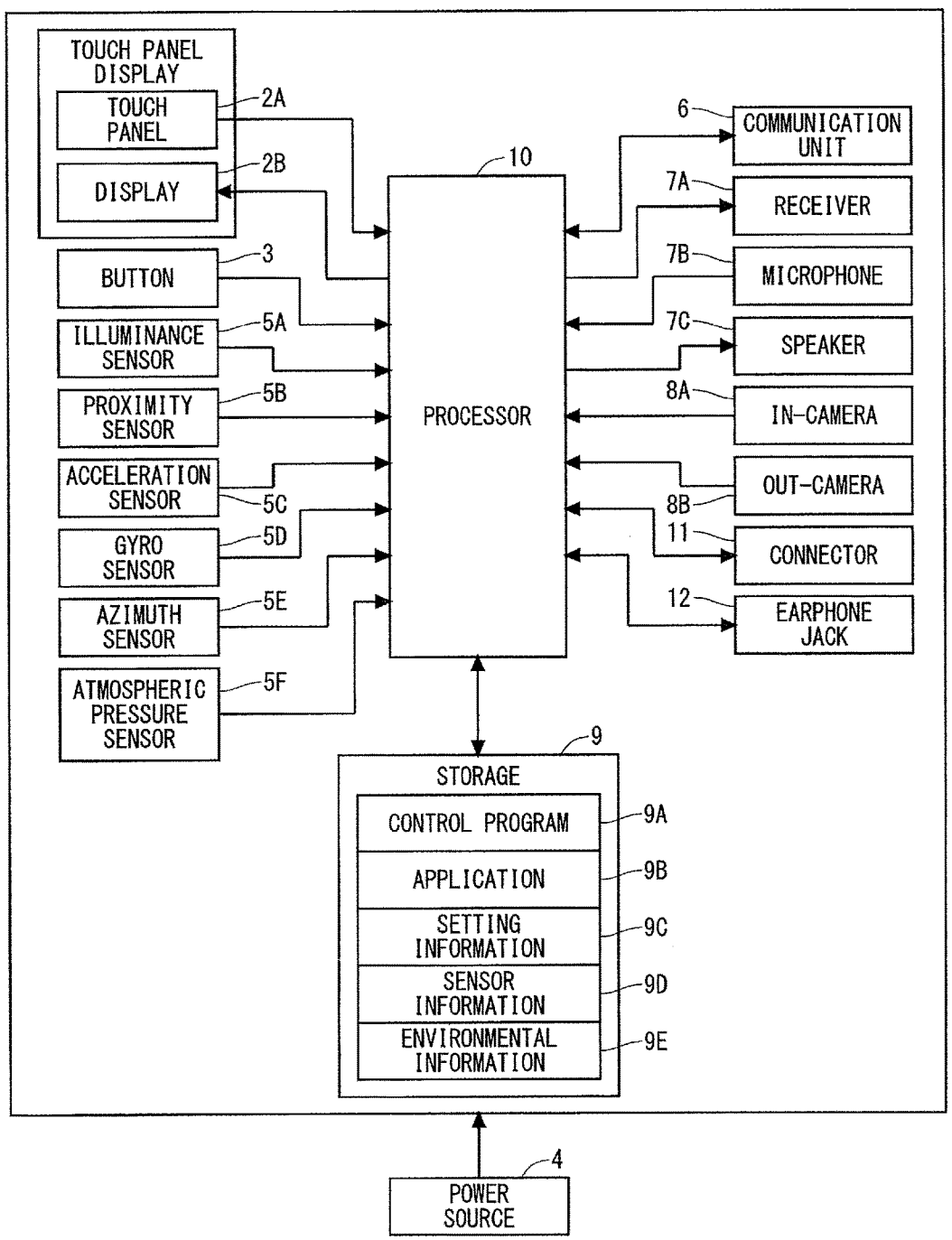
FIG. 1 is a block diagram showing a function configuration of a smartphone according to an embodiment.
Figure 2:
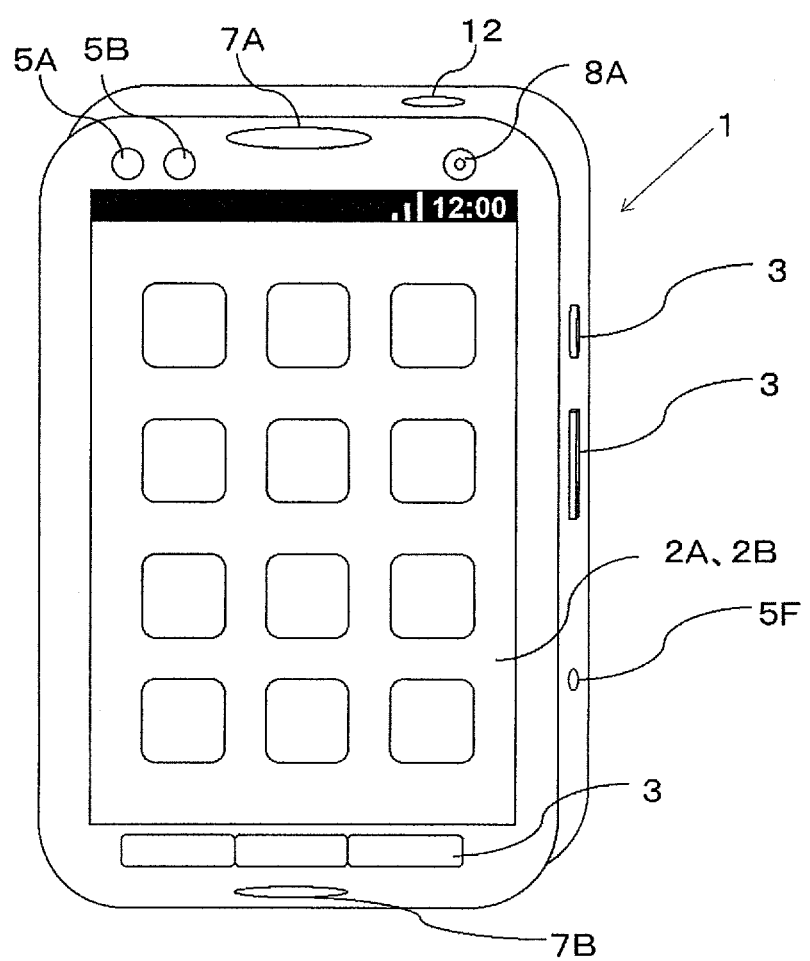
FIG. 2 is a front appearance diagram of the smartphone according to an embodiment.
Figure 3:
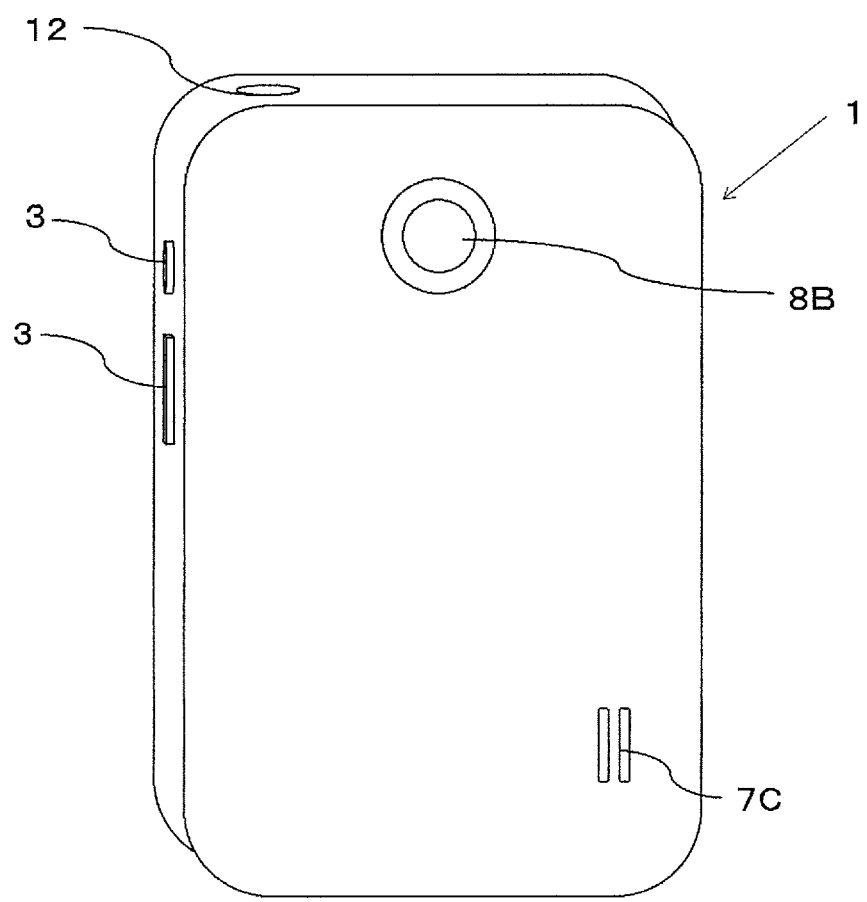
FIG. 3 is a back appearance diagram of the smartphone according to an embodiment.

An example of a configuration of the smartphone 1 according to one embodiment is described with reference to FIGS. 1, 2, and 3. FIG. 1 is a block diagram showing a configuration of the smartphone 1 according to one embodiment. FIGS. 2 and 3 are appearance diagrams of the smartphone 1. The smartphone 1 includes a touch panel 2A, a display 2B, a button 3, a power source 4, an illuminance sensor 5A, a proximity sensor 5B, an acceleration sensor 5C, a gyro sensor 5D, an azimuth sensor 5E, an atmospheric pressure sensor 5F, a communication unit 6, a receiver 7A, a microphone 7B, a speaker 7C, an in-camera 8A, an out-camera 8B, a storage 9, a processor 10, a connector 11, and an earphone jack 12.

The touch panel 2A and the display 2B may be disposed so as to overlap each other or may also be located in separate positions. Each of the touch panel 2A and the display 2B may be located in a separate surface or a plurality of touch panels 2A and a plurality of displays 2B may also be located. The touch panel 2A and the display 2B may be an in-cell type display having both an input function and a display function.

A touch panel of electrostatic capacitance type, electromagnetic induction type, surface acoustic wave type, pressure sensitive type, liquid resistance film type, and infrared type, for example, is arbitrarily applied to the touch panel 2A to detect a contact and proximity of a finger or a stylus pen, for example. Accordingly, the touch panel 2A identifies an operation performed by a user on the smartphone 1 and transmits information of the operation to the processor 10. When an electrostatic capacitance type touch panel is adopted, it can be detected that the touch panel is located in the water by measuring a change in an electrostatic capacitance. Specifically, when the electrostatic capacitance becomes uniform, that is to say, becomes about a predetermined value over an entire surface of the touch panel 2A, it can be determined that the touch panel 2A is submerged in the water. When the electrostatic capacitance becomes uniform in part of a region detected by the touch panel, it is recognized that the part of the region is cover by water. When a surface acoustic wave type touch panel is adopted, a contact with water can be detected by measuring an attenuation of a surface acoustic wave detected by the touch panel. When a pressure sensitive type touch panel is adopted, a contact with water can be detected by detecting a water pressure, and when an infrared type touch panel is adopted, a contact with water can be detected by using an attenuation of infrared light. From the above, the touch panel 2A can be used as a water detector.

The display 2B can display an image. A user can confirm a state of a terminal based on a display of the display 2B. A display device such as a liquid crystal display, an organic EL (electroluminescence) display, a non-organic EL display, and an electronic paper, for example, is used for the display 2B. The display 2B functions as a display in the smartphone 1.

When the button 3 is pressed, the button 3 receives various inputs from the user including ON/OFF of a power source, a switch to a sleep mode, a release of the sleep mode, and a volume control, for example, of the smartphone 1. The button 3 may be either single or plural and also may be a physical key using a task switch or a membrane switch or a soft key provided by using part of the touch panel 2A. The button 3 may have a configuration of detecting an input via the electrostatic capacitance or the pressure sensitivity. The physical key allows the input during used in the water, and moreover, when the button 3 has an electrostatic capacitance sensor or a pressure sensitive sensor, the button 3 can detect the water. That is to say, also the physical key provided with the above sensor may have a function as the water detector.

The power source 4 supplies electrical power to various units in the smartphone 1. A battery is used for the power source 4, for example.

The illuminance sensor 5A is used for detecting a surrounding illuminance to control brightness of the display 2B. The higher the illuminance detected by the illuminance sensor 5A becomes, the processor 10 sets the display 2B brighter so that visibility of the display 2B is enhanced. The illuminance sensor can be used as an illuminance detector.

A proximity sensor of electrostatic capacitance type, ultrasonic type, photoelectric type, magnetic type, and induction type, for example, is arbitrarily applied to the proximity sensor 5B to detect proximity of an object to the proximity sensor 5B. When an electrostatic capacitance type proximity sensor is adopted, the water can be detected by using a change in the electrostatic capacitance, and when an ultrasonic type proximity sensor or a photoelectric type proximity sensor is adopted, the water can be detected by using an attenuation of signal in the water. That is to say, also the proximity sensor may have a function as the water detector.

The illuminance sensor 5A and the proximity sensor 5B do not have to be provided separately, so that the proximity sensor 5B may double as the function of the illuminance sensor 5A, or the illuminance sensor 5A may be used as a substitute of the proximity sensor 5B. That is to say, the proximity sensor may also be used as the illuminance detector.

The acceleration sensor 5C detects a direction and a magnitude of acceleration acting on the smartphone 1.

The gyro sensor 5D detects an angular velocity of the smartphone 1.

The azimuth sensor 5E detects a direction of earth magnetism and detects an azimuth direction in which the smartphone 1 is oriented.

The atmospheric pressure sensor 5F detects an atmospheric pressure acting on the smartphone 1. The atmospheric pressure sensor can also be used as the water detector to determine whether the smartphone 1 is located in the water in accordance with a change in the atmospheric pressure. The atmospheric pressure sensor can also be used as a water depth acquisition unit which detects a hydraulic pressure in accordance with a change in a detected pressure, thereby estimating a water depth.

The communication unit 6 includes a circuit to convert a signal for communication and an antenna to transmit and receive the signal. A communication standard used by the communication unit 6 is a wireless communication including, for example, 2 G, 3 G, LTE (Long Term Evolution), 4 G, WiMAX® (Worldwide Interoperability for Microwave Access), Bluetooth®, IEEE 802.11, NFC (Near Field Communication), IrDA (Infrared Data Association), and Zigbee®. The wireless communication system of the communication unit 6 is not limited to the above, however, various wireless communication systems are included. The communication unit 6 functions as a communication unit in the smartphone 1. The communication unit 6 can use Internet communication, thereby obtaining various information including a weather information and a date and time information. When the communication unit 6 has the communication function of 3 G or LTE, the communication unit 6 can estimate a position information based on a base station which the communication unit 6 is connected. The communication using such a communication function also has a function as a position information acquisition unit.

The receiver 7A outputs sound. Although the receiver 7A is mainly used for outputting a voice of a call, the receiver 7A can also output a music and an alarm, for example. The receiver 7A is located inside an opening provided in a surface where the display 2B is located.

The speaker 7C also outputs sound. The speaker 7C is mainly used for outputting an audio of a video, a music, and an alarm, and is also used for outputting a voice of a call during a hands-free call. It is also applicable to provide either the receiver 7A or the speaker 7C which doubles as other's function.

The microphone 7B receives an input of sound. The microphone 7B converts a voice of the user and a surrounding environmental sound into a sound signal. A total number of microphones 7B is not limited to one, however, a plurality of microphones 7B may be provided.

The in-camera 8A and the out-camera 8B convert a taken image into an electrical signal. The in-camera 8A is located in a surface where the display 2B is provided in the smartphone 1, and the out-camera 8B is located in a surface opposite to the side of the in-camera 8A.

The storage 9 is made up of a storage medium such as a flash memory, an HDD, a SSD, a memory card, an optical disk, a magnetic optical disk, or a RAM, for example, to store a program or data. The storage 9 may be a combination of a plural types of storage mediums or may include a reading device, in addition to the storage medium, to read out information from the storage medium.

The program stored in the storage 9 includes a control program 9A which controls an operation of the smartphone and an application 9B. The control program 9A includes OS, for example. The application 9B is executed in a foreground when an input to a corresponding icon is received, and the display 2B displays a screen which enables an operation on the application. The application 9B may also be executed in a background. The application 9B also includes an application installed by the user. The data stored in the storage 9 includes various setting information 9C, a sensor information 9D including a history information of signals transmitted from the various sensors, for example, and an environmental information 9E obtained from a result determined from the sensor information 9D and Internet communication, for example.

The processor 10 is an example of a controller. The smartphone 1 includes at least one processor 10 and provides a control and a processing capacity to achieve various functions described below. In accordance with various embodiments, the at least one processor 10 may be implemented as a single integrated circuit (IC) or as multiple communicatively coupled IC's and/or discrete circuits. It is appreciated that the at least one processor 10 can be implemented in accordance with various known technologies.

In one embodiment, the processor 10 includes one or more circuits or units configurable to perform one or more data computing procedures or processes by executing instructions stored in an associated memory, for example. In other embodiments, the processor 10 may be implemented as firmware (e.g. discrete logic components) configured to perform one or more data computing procedures or processes.

In accordance with various embodiments, the processor 10 may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

The processor 10 includes a determination unit and a hand-off unit. In some embodiments, the determination unit and the hand-off unit are achieved as executable commands stored in the memory when executed by a processing circuit included in the processor 10 and execute each process described in the present disclosure. In another embodiment, the determination unit and/or the hand-off unit may be achieved by a separate IC's or a discrete circuit communicatively coupled to the processor to achieve each function described in the present disclosure.

The processor 10 executes the application 9B and the control program 9A and totally controls the operation of the smartphone 1 to achieve the various functions.

The smartphone 1 may include a GPS (Global Positioning System) receiver and a vibrator in addition to the above function units. The processor 10 can use a signal from a GPS satellite received by the GPS receiver to detect a current position. Accordingly, not only the communication unit but also the processor has a function as the position information acquisition unit.

The vibrator has an eccentric motor and a piezoelectric element, for example, and vibrates the entire smartphone 1, so that it is used for giving notice of the user, for example.

Figure 5:
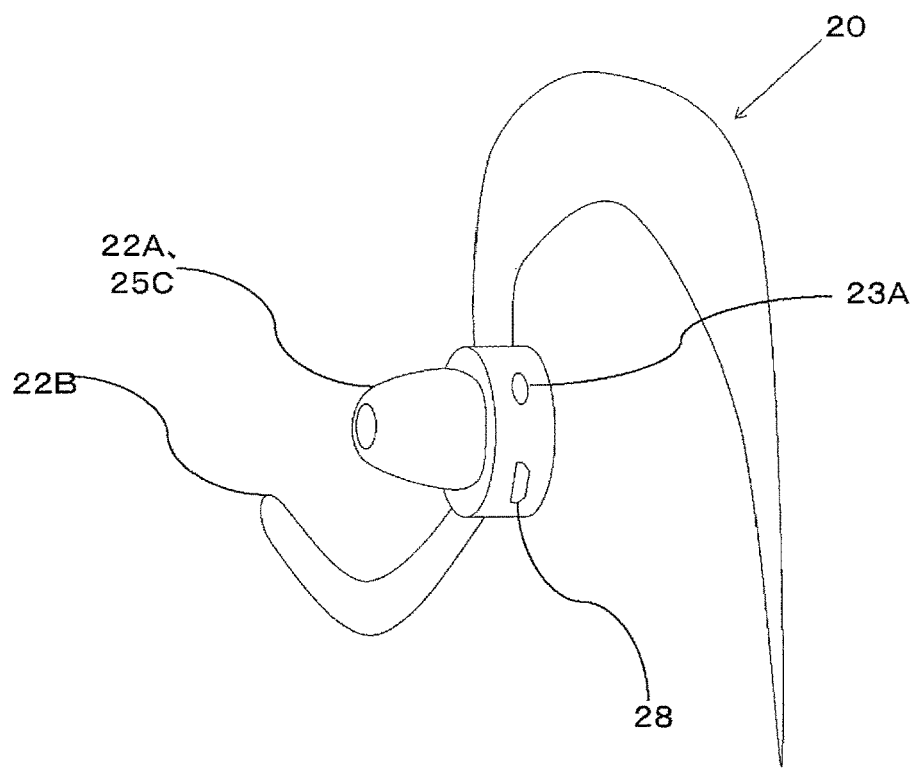
FIG. 5 is an appearance diagram of the headset according to an embodiment viewed from one direction.
Figure 6:
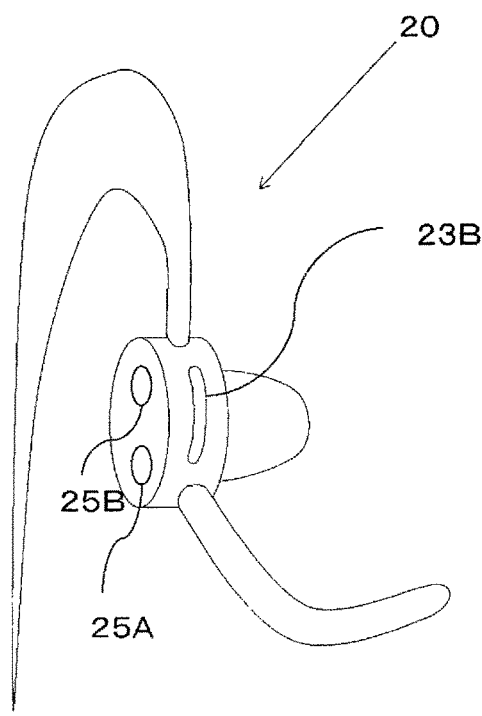
FIG. 6 is an appearance diagram of the headset according to an embodiment viewed from a direction different from that in FIG. 4.

Next, an example of a configuration of a wearable device according to one embodiment is described with reference to FIGS. 4, 5, and 6. Herein, a headset type device is described as an example.

The headset 20 is made up of a communication unit 21, a receiver 22A, a microphone 22B, a button 23A, a volume control button 23B, a power source 24, an atmospheric pressure sensor 25A, an illuminance sensor 25A, a heart rate sensor 25C, a storage 26, at least one processor 27, and a connector 28.

The communication unit 21 makes communication with the smartphone 1. The communication unit 21 uses a communication standard such as Bluetooth®, IEEE 802.11, NFC, IrDA, and Zigbee®, for example, to make communication with the communication unit 21. The communication standard of the communication unit 21 is not limited to the above, so that the communication unit 21 may make communication using various wireless communication systems. The communication method may include a wire communication using a cable connected to the connector 11 or a cable connected to the earphone jack 12 in the smartphone 1 or a communication via another communication terminal. As described above, the connector 11 and the earphone jack 12 may also be used as the communication unit in the smartphone 1.

The receiver 22 has a function similar to the receiver 7A.

The microphone 22B has a function similar to the microphone 7B.

The button 23A receives an operation performed by the user. The button 23A receives the operation such as a power-on operation, a power-off operation, a call-receiving operation, a call operation, an operation to mute the receiver 22A or the microphone 22B, and a switch to a pairing mode in Bluetooth®, for example. It is changed in accordance with an operation being executed by the headset 20, an operation being executed by the smartphone 1, and a time period of a long press of the button 23A, for example, which operation the button 23A receives as when the button 23A receives the pressing of the button. The above operations may also be received by separate buttons several times instead of achieving all the effects with one button 23A, or the plurality of effects may also be achieved by a voice input from the microphone 22B. When the button 23A of the headset 20 also has the function of touch panel, a gesture operation performed by the user may also be received. When the electrostatic capacitance type touch panel or the pressure sensitive type touch panel is adopted, for example, the water can be detected in a manner similar to the touch panel 2A of the smartphone 1. Thus, also the button 23A may have a function as the water detector.

The volume control button 23B receives an input for changing a volume setting. As for the volume to be changed, a volume setting of the headset 20 may be changed or a volume setting of the smartphone 1 to which the headset 20 is connected may also be changed. A volume of the microphone 22B may also be changed. The volume control button 23B may be made up of a physical button or the touch panel may also be used as the volume control button 23B. When the electrostatic capacitance type touch panel or the pressure sensitive type touch panel is adopted, for example, the volume control button 23B also functions as the water detector.

The power source 24 has a function similar to the power source 4 and supplies electrical power to various units in the headset 20.

The atmospheric sensor 25A has a function similar to the atmospheric sensor 5F.

The storage 26 has a function similar to the storage 9. The storage 26 stores data of, for example, a control program 26A, a setting information 26B regarding a connection to the smartphone 1 and the volume setting, a sensor information 26C to record a history of information received by the various sensors, and an environmental information 26D to record a determination result based on a weather or the sensor information 26C.

The processor 27 has a function similar to the processor 10 and controls the various units in the headset 20.

The connector 28 is used for charging the power source 24 or a data communication. A wire communication can be performed by connecting a cable corresponding to the connector 28.

The headset 20 may also have various sensors other than the above sensors. When the headset 20 has a temperature sensor, for example, information of body temperature, atmospheric temperature, and water temperature can be obtained. When a plurality of LEDs indicating an operating condition are mounted, for example, the user may recognize a remaining amount of the power source 24 or the operating condition.

Figure 7:
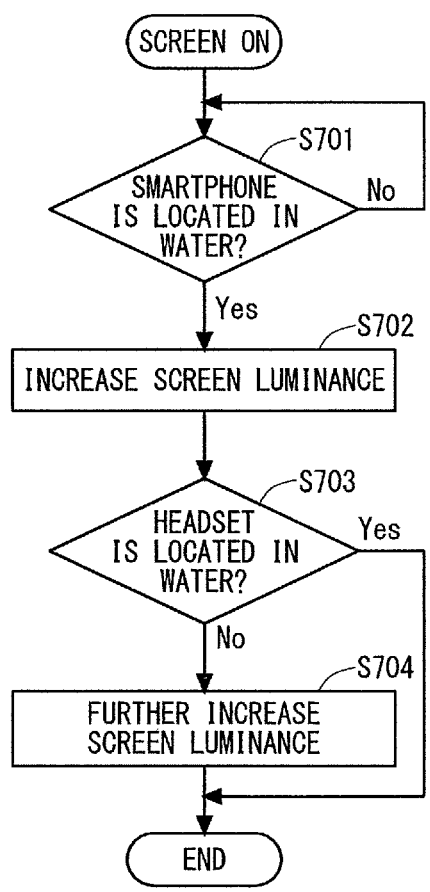
FIG. 7 is a flow chart showing a processing flow according to an embodiment.

A processing flow executed by the smartphone 1 and the headset 20 according to a first embodiment is described using FIG. 7. A term of "own apparatus" indicates the smartphone 1 hereinafter.

In a step S701, the processor 10 of the smartphone 1 determines whether the own apparatus is located in the water. The determination may be performed using an electrostatic capacitance type touch panel 2A, or it is also applicable to use another means for detecting the water such as examining a signal of the atmospheric pressure sensor 5F, for example. When the processor 10 detects, using the electrostatic capacitance type touch panel 2A, that the own apparatus is located in the water, it is recognized to what extent the touch panel 2A is submerged in the water. The determination whether the own apparatus is located in the water may be performed when the entire surface of the touch panel 2A is covered by water, when an area which is equal to or more than a threshold value in the total area of the touch panel 2A is covered by water, or when a specific position detects the water.

As for another determination method, when the atmospheric pressure sensor 5F is used, it may be determined that the own apparatus is located in the water when an increase in pressure is detected, or it may also be determined that the own apparatus is located in the water when a change in the signal of the atmospheric pressure sensor 5F decreases per unit time, since the change in the value of the atmospheric pressure sensor 5F increases outside the water.

When the water is detected in the step S701, the processing proceeds to a step S702.

In the step S702, the processor 10 executes a processing of brightening the screen. The processing may be executed by increasing a value for setting a screen luminance which is set in the smartphone 1 or by uniformly increasing, regardless of the value, an intensity of a backlight in case where a liquid crystal display is adopted, or an emission intensity of a light-emitting display in case where a light-emitting display such as an organic EL display is adopted, compared with an intensity in a case where the smartphone 1 is used outside the water.

When the electrostatic capacitance type touch panel 2A is adopted in detecting the water in the step S701, it is recognized to what extent the screen is submerged in the water in accordance with a region where the electrostatic capacitance becomes uniform. Using the above feature, only the part where is submerged in the water may be brightened, or the entire surface of the screen may be brightened.

After the step S702 is completed, the processing proceeds to a step S703. In the step S703, the processor 10 determines whether or not the headset 20 is located in the water. When it is determined that the headset 20 is not located in the water as a result of the determination, the processing proceeds to a step S704, and the screen is further brightened compared with the state where the screen is brightened in the processing of the step S702.

Both the steps S701 and S703 indicate the means of detecting whether each apparatus is located in the water. There is a plurality of detection methods. Any detection method may be adopted, and it is also applicable to combine the plurality of methods to enhance a detection accuracy.

For example, the detection may be performed by a method of using an electrostatic capacitance type touch panel, by a method of using the atmospheric pressure sensor 25A of the headset 20, or by a means using an illuminance sensor or a temperature sensor.

The case of using the atmospheric pressure sensor is described. Using a fact that the pressure is high in the water, it can be determined that the own apparatus is located in the water when the pressure detected by the atmospheric pressure sensor 25A drastically increases. Since the change in the pressure detected by the atmospheric pressure sensor 25A increases outside the water, it may also be determined that the own apparatus is located in the water when a change in the signal of the atmospheric pressure sensor 25A decreases per unit time.

Next, a case of mounting an apparatus, such as the illuminance sensor 25B or a solar panel, which can detect light is described. Since the light attenuates in the water, it can be determined that the own apparatus is located in the water by examining a decrease in the light in accordance with a change in the signal of the illuminance sensor 25B or a power generation amount of the solar panel.

It may also be determined that the own apparatus is located in the water based on a change in a temperature detected by the temperature sensor. Since a sea bathing, for example, is generally performed in summer season, it is expected that a seawater temperature is lower than the atmospheric temperature. Thus, when the temperature detected by the temperature sensor included in the smartphone or the headset decreases, it can be determined that the own apparatus is located in the water. It is also applicable that a season is determined in accordance with a date stored in a terminal to determine that the own apparatus is located in the water when the temperature increases in winter. Since the water temperature changes slower than the atmospheric temperature, the determination may also be performed based on a history of the temperature change per unit time.

The determination whether the own apparatus is located in the water may also be performed based on a reception intensity of radio wave. Since a reception sensitivity of the radio wave decreases in the water, it may be determined that the smartphone 1 is located in the water and the headset 20 is located outside the water when the intensity of the radio wave received by communication unit 6 of the smartphone 1 is larger than the reception intensity of communication unit 21 of the headset 20.

When the headset 20 receives an instruction from the smartphone 1 to which the headset 20 is connected, the headset 20 may perform the measurement and the determination. The headset 20 may always make the determination singly and transmit a current determination result and a history of a determination result upon request from the smartphone 1. It is also applicable that the signal detected by the sensor included in the headset 20 is continuously transmitted to the smartphone 1 side so that the smartphone 1 performs the determination.

Both the steps S702 and S704 indicate the processing of changing the screen luminance. The screen luminance may be uniformly changed or may be changed based on various determination conditions.

For example, it is applicable that the water depth is estimated from the water pressure which can be detected by means of detecting the pressure such as the atmospheric pressure sensor 25A, and the screen luminance is controlled based on the water depth. It is also applicable that, when the button 3 included in the smartphone 1, the button 23A included in the headset 20, or the volume control button 23B included in the headset 20 is operated, the reception intensity of the signal transmitted from the headset 20 or the reception intensity of the signal received by the headset 20 is measured, and a distance between the own apparatus and the headset 20 is measured based on the reception intensity, and the screen luminance is controlled based on the distance.

Figure 9:
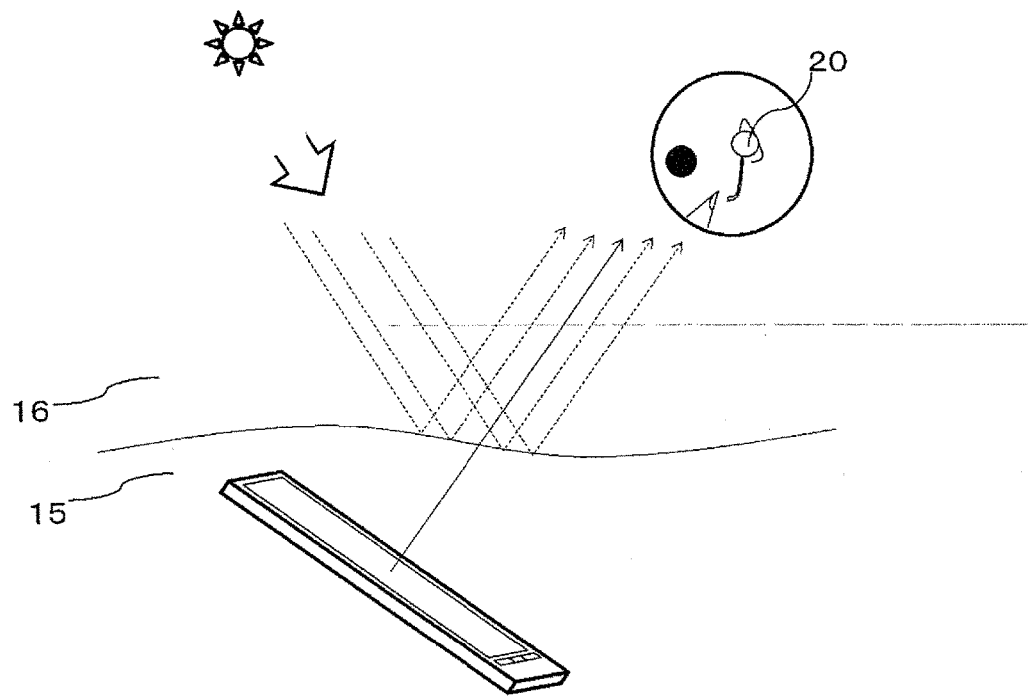
FIG. 9 is a diagram showing a relationship between an incident direction of sunlight and a position of the smartphone according to an embodiment.

A reflection of a sunlight from a water surface increases as an angle of the sunlight gets closer to be vertical to the water surface, and this may cause the screen to be hard to visually recognize. Accordingly, it is also applicable to estimate a direction in which the sunlight radiates using the date and time information or the position information received from the smartphone 1 or the headset 20. It is also applicable to estimate the angle of the sunlight based on the estimated direction and significantly increase the luminance of the screen as the estimated angle gets closer to be vertical to the water surface. Since a line of sight of the user is likely to be nearly vertical to the screen, it is also applicable to estimate the direction of the screen based on the signal from the acceleration sensor 5C or the gyro sensor 5D and significantly increase the screen luminance when a vertical direction of the screen approximates a reflection direction of the sunlight reflected from the water surface, as shown in FIG. 9. When the smart phone 1 or the headset 20 includes the illuminance sensor or the solar panel, it is also applicable to measure the signal from the illuminance sensor or the power generation amount of the solar panel when the apparatus to be measured is located outside the water, estimate a surrounding brightness based on the measurement result, and set the screen luminance higher as the estimated surrounding brightness gets larger. The reason is that the reflection from the water surface increases as the surrounding brightness gets larger and thereby the screen is hard to visually recognize.

It is also applicable to estimate the surrounding brightness in accordance with the weather information such as a fair or cloudy weather, for example, received by the smartphone 1 or the headset 20 and set the screen luminance higher as the area around the apparatus is brighter.

As the waves get rougher, the water gets more turbid and poor visibility may occur in the water. Accordingly it is also applicable to receive a wind velocity information over a few hours to date in a current position or a position indicated by a position information which is finally detected and estimate a roughness of waves in a position where the user is located based on the received wind velocity information. The screen luminance may be set higher as the waves get rougher.

Figure 10:
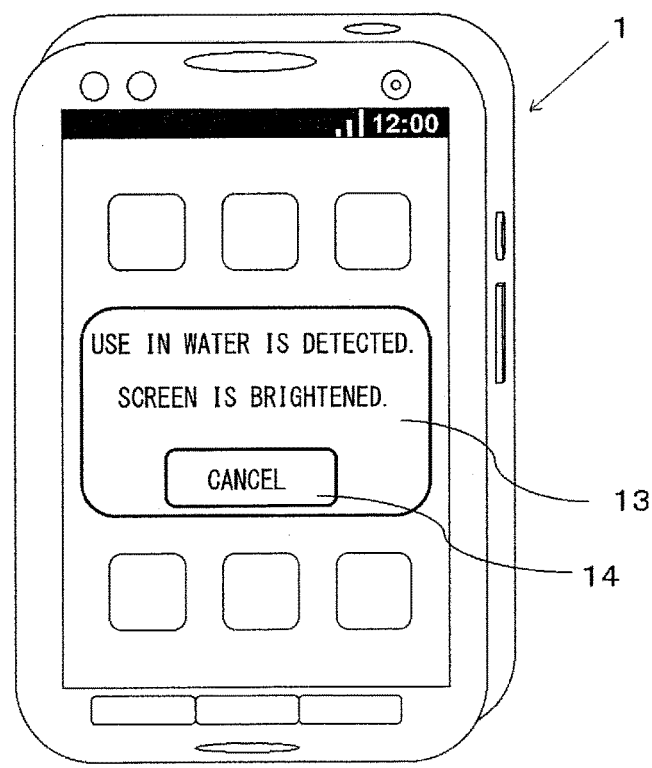
FIG. 10 is a diagram showing a display of a screen according to an embodiment.

As described above, when the smartphone is located in the water and the headset 20 is located outside the water, the screen luminance is caused to increase. It is considered that some user may prefer suppressing an increase in a power consumption. Accordingly, it may be determined by a previous user setting whether or not the above function is rendered effective. Alternatively, as shown in FIG. 10, it is also applicable to display a cancel button 14 together with a message as a pop-up 13 on the display so that the user can set the operation of increasing the screen luminance ineffective. It is also applicable to display a determination button together with a message, which indicates that the screen luminance is increased, instead of the cancel button and the operation of increasing the screen luminance is set effective by pressing the determination button. Since the smartphone 1 is located in the water, it is considered that the above input operation may not be performed on the electrostatic capacitance type touch panel, for example. In this case, the input operation may be performed via the button 3. Alternatively, the operation may also be performed by means of the button 23A, the volume control button 23B, or the voice input, for example, from the headset side.

The above display processing may be performed before the processing of the step S702 or before the processing of the step S704 in FIG. 7.

The processing of increasing the screen luminance may also be executed only when it is expected that there is a high possibility that the user sees the screen. The above state includes cases where, for example, a notice information is received from the smartphone 1, an image or a video is being taken with the in-camera 8A or the out-camera 8B, a video or an image stored in the smartphone 1 is being viewed, a music to be reproduced is switched, characters are being input, and another specific application is being used.

When the light-emitting display such as the organic EL display is adopted to the display, only part of the display relating to the notice information which should be emphasized may be set brighter.

The processing of increasing the screen luminance may be performed after an elapse of a certain period of time since the smartphone 1 has been submerged in the water. The screen luminance may be kept bright when the smartphone 1 moves in and out of the water frequently. Moreover, when the smartphone 1 moves out of the water, the function of brightening the screen in the water may be immediately caused to be off so that the screen luminance is rendered a normal state, or the screen luminance may be rendered the normal state after an elapse of a certain period of time or when almost no water drop is detected by the touch panel. The screen may be caused to be darkened in accordance with a user's operation.

When the terminal includes a plurality of displays, the screen luminance of all the displays included in the terminal may be increased, or the screen luminance of only some specific displays may be increased.

Next, a processing flow executed by the smartphone 1 and the headset 20 according to a second embodiment is described using FIG. 8.

The flow from a step S801 to a step S804 via steps S802 and S803 is substantially the same with the flow from the steps S701 to S704, so that the description is omitted.

In a step S801, when the smartphone 1 determines whether the own apparatus is not located in the water, the processing proceeds to a step S805. In the step S805, it is determined that the headset 20 is located in the water. When the headset 20 is located in the water as a result of determination, the processing proceeds to a step S806. In the above case, the smartphone 1 is located outside the water and the headset 20 is located in the water. That is to say, there is a possibility that the user is drowning in the water, so that the heart rate sensor 25C in the headset 20 is used to measure a heart rate of the user in the step S806.

A step S807 is performed after the step S806. When it is determined in the step S807 that the heart rate of the user does not fall within a normal value which is previously set, the user is considered to be in a dangerous state, and the processing enters an emergency mode (a step S808). A predetermined processing is executed in the emergency mode.

The predetermined processing includes, for example, a transmission of a mail to an emergency contact number which is set, a display, on the screen, of a message such as a contact information or a procedure of emergency treatment to be performed on the user who becomes unconscious, sounding an alarm at a maximum volume from the speaker 7C. There is a wearable device which includes a lifesaving function to prevent a drowning accident, and when a communication between the smartphone 1 and the wearable device is available, a signal for rendering the lifesaving function effective may be transmitted to the wearable device. The wearable device may include a life jacket which expands upon receiving the signal, for example.

An object to be measured may include a biological information other than the heart rate. The object to be measured may include a change in the body temperature and an oxygen concentration in blood, for example. The object to be measured may also include a period of time during which it is detected that the headset is located in the water.

Not only the above determination, but also further different determination criteria may be additionally provided. For example, when it is detected that the smartphone 1 is shaken hard together with the above condition, the state where the user is drowning in the water can be detected more accurately, so that a malfunction can be reduced.

Although the processing described in the above embodiments is performed by the smartphone 1 and the headset 20, another electronic apparatus which is assumed to be used in the water may also be applied similarly instead of the smartphone 1. The above electronic apparatus includes, for example, a feature phone, a tablet terminal, a PDA, a digital camera, a music player, a game machine, and a watch type device.

Figure 11:
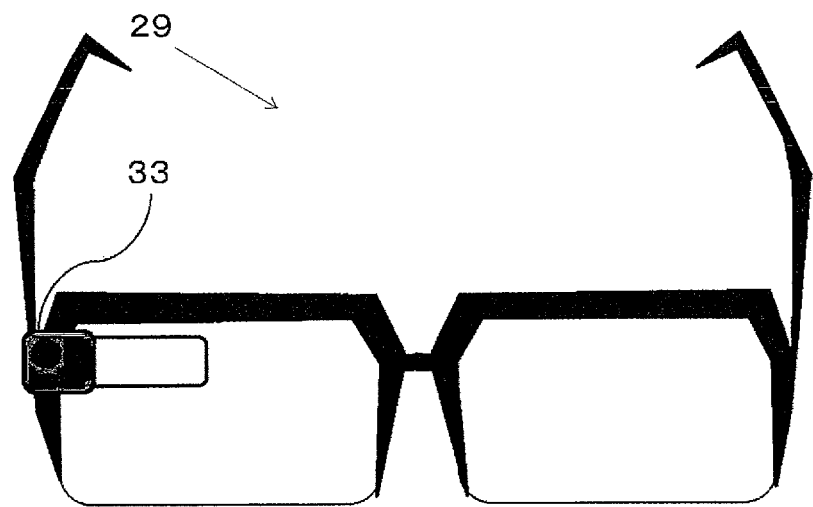
FIG. 11 illustrates an example of a wearable device according to an embodiment.
Figure 12:
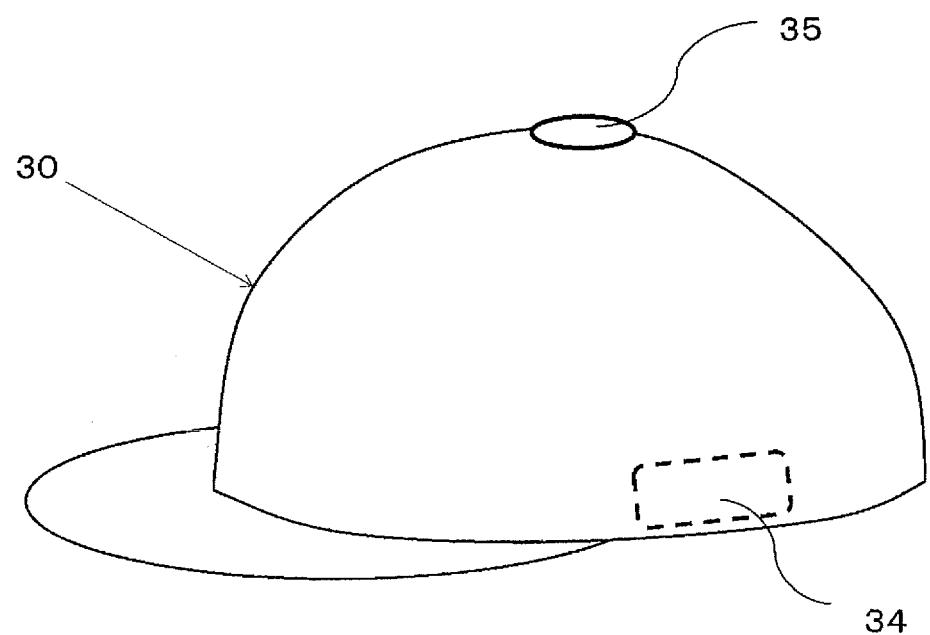
FIG. 12 illustrates an example of a wearable device according to an embodiment.
Figure 13:
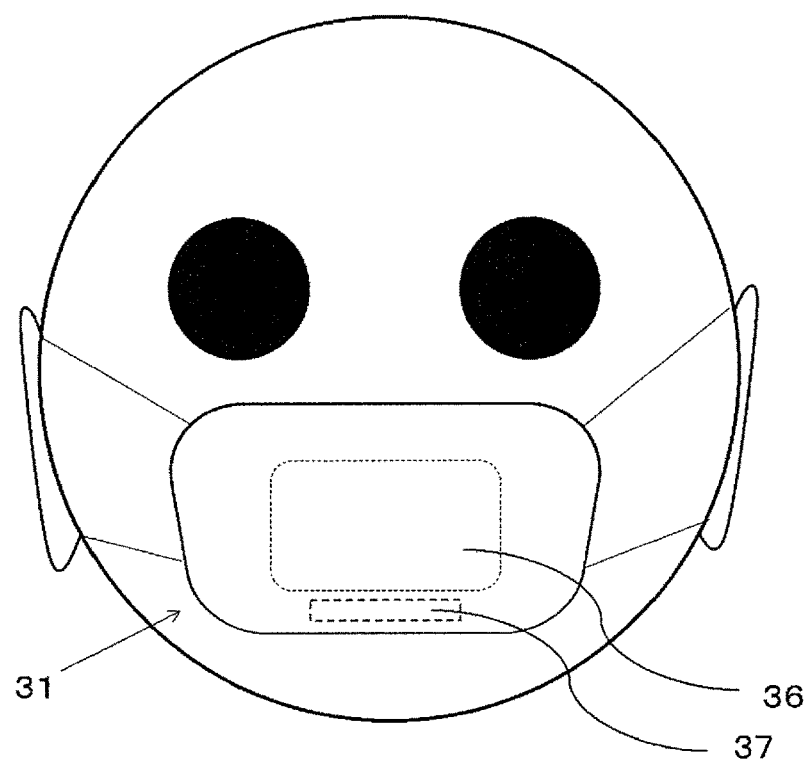
FIG. 13 illustrates an example of a wearable device according to an embodiment.
Figure 14:
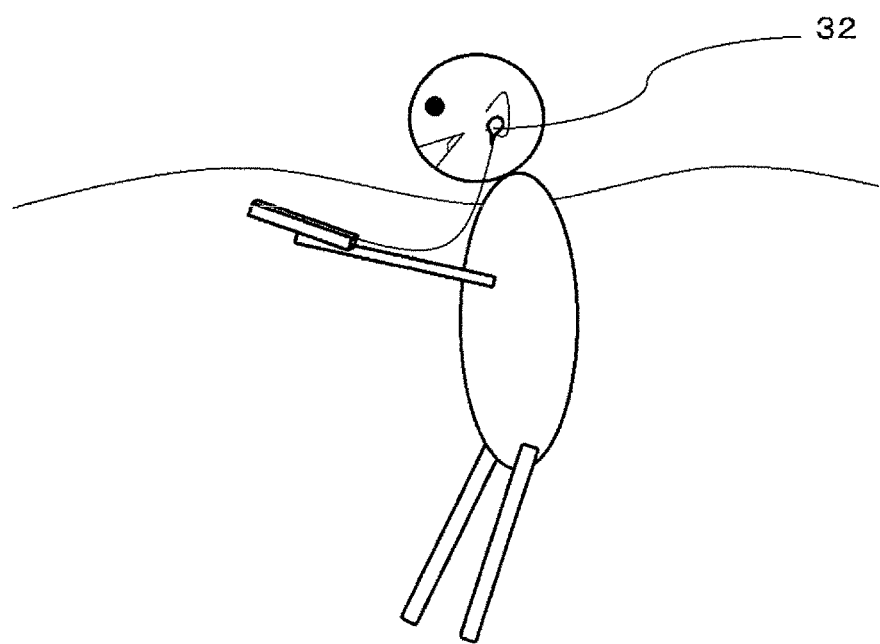
FIG. 14 illustrates an example of a wearable device according to an embodiment.

The headset 20 is adopted as a means of detecting a viewpoint position of the user, however, not only the headset type device but also another type of device may be adopted as long as it meets the configuration required in each embodiment. Specifically, the above embodiments may be implemented by a wearable device such as an eyeglasses type device 29 shown in FIG. 11, a cap type device 30 shown in FIG. 12, a mask type device 31 shown in FIG. 13, or an earphone type device 32 shown in FIG. 14, for example, as long as it is attached near a head of the user and has a means of detecting the water, so that another type of device other than those exemplified above may also be adopted. Furthermore, the above embodiments may also be implemented by an equipment part of which is located near the head of the user.

The above types of devices have configurations different from the headset 20. For example, the eyeglasses type device may include a camera 33 for taking a view in an eye direction of the user, the device such as the cap type device attached firmly to the head may include a temperature sensor 34 and may also include an illuminance sensor 35 on a top of the head. The mask type device may include a harmful material sensor 36 for detecting a harmful material or a temperature sensor 37, for example. Although the headset 20 detects the water using the touch panel or the atmospheric pressure sensor, when another sensor included in each device described above can detect that the device is located in the water, it may be used as a water detection means. For example, using the camera 33, it can be recognized that that the user is located near the water or the smartphone is submerged in the water by an image analysis.

Since the earphone type device 32 which has a wired connection to the smartphone can be used even when the smartphone sinks deep into the water by reason that the earphone type device 32 has a wired connection to the smartphone.

Moreover, the wearable device may include a GPS reception unit to obtain the position information. In the above case, even when the smartphone 1 is located in the water and thereby cannot receive a GPS information, the wearable device which has a high possibility of being located outside the water can obtain the position information.

Furthermore, the wearable device itself may use not only a short-range communication used for the connection to the smartphone 1 but also a communication based on a communication standard such as 2 G, 3 G, LTE, 4 G, and WiMAX® singly, for example, and also may use the wired connection for the communication with the smartphone 1. For example, it is applicable to make communication via a micro USB terminal or an earphone jack included in the smartphone 1 or replace a part of a communication path with the wired communication or the like to make communication using a plurality of communication methods. A communication using acoustic wave or light may be performed, and a human body communication may also be used.

Although the control performed by the two apparatuses is described above, the number of the apparatus does not necessarily have to be two. For example, when the apparatus attached near the head is located outside the water and a watch type apparatus or a ring type apparatus is located in the water, there is a high possibility that the smartphone 1 held in and operated by a hand is located near the water surface, thereby getting soaked soon afterward, so that the control to increase the screen luminance may be performed. When there are a plurality of wearable devices attached near the head of the user, the determination is performed by more apparatuses, so that the positions of the viewpoint of the user and smartphone 1 can be determined with a high degree of accuracy. For example, in case where the smartphone 1, the eyeglasses type device 29, and the headset 20 are used, when it is detected that the smartphone 1 is located in the water and the headset 20 is located outside the water, the processing proceeds to the step S704 and the screen luminance is considerably increased based on the processing of FIG. 7. However, when the eyeglasses type device 29 is located in the water in addition to the above state, it is considered that only a front surface of a face of the user is located in the water and both the viewpoint of the user and the smartphone 1 are located in the water, so that the processing is finished without executing the step S704. When there are the plurality of wearable device attached near the head as described above, a priority order of the wearable devices used for the determination may be set.

An apparatus other than the smartphone 1 and the wearable device attached near the head may be further used for receiving the weather information and the GPS information, for example.

Although the art of appended claims has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

The invention claimed is:

1. An electronic apparatus, comprising:
   a display configured to be able to change brightness of the display;
   a water detection circuit configured to detect water;
   a communication circuit configured to be able to communicate with another electronic apparatus;
   at least one processor configured to, when the at least one processor detects, using the water detection circuit, that at least part of the electronic apparatus is located in the water and detects, using the communication circuit, that the another electronic apparatus is not located in the water, brighten the display compared with that when the at least one processor detects, using the water detection circuit, that the at least the part of the electronic apparatus is located in the water and detects, using the communication circuit, that at least part of the another electronic apparatus is located in the water; and
   a water depth acquisition circuit configured to obtain a water depth of the display, wherein when the display comprises a first part that is submerged in the water and a second part that is not submerged in the water, the at least one processor is configured to change the brightness of the first part but not the second part.

2. The electronic apparatus according to claim 1, wherein the communication circuit is configured to receive a signal from the another electronic apparatus attached near a head of a user.

3. The electronic apparatus according to claim 1, further comprising:
   an illuminance detection circuit configured to detect a surrounding brightness, wherein
   the at least one processor is configured to change the brightness of the display based on the surrounding brightness.

4. The electronic apparatus according to claim 1, further comprising:
   a memory configured to store information relating to a weather; and
   a position information acquisition circuit configured to obtain a position information, wherein
   the at least one processor is configured to change the brightness of the display based on the information relating to the weather and the position information.

5. The electronic apparatus according to claim 4, wherein the information relating to the weather includes a history of wind velocity in an area indicated by the position information.

6. The electronic apparatus according to claim 1, further comprising:
   a date and time acquisition circuit configured to obtain a current date and time; and
   a position information acquisition circuit configured to obtain a position information, wherein
   the at least one processor is configured to change the brightness of the display based on the date and time and the position information.

7. The electronic apparatus according to claim 1, wherein the at least one processor is configured to execute a predetermined processing when a first conditions, a second conditions, and a third condition are satisfied:
   the first condition indicates that the water detection circuit does not detect the water;
   the second condition indicates that the at least one processor detects, using the communication circuit, that the another electronic apparatus is located in the water; and
   the third condition indicates that the at least one processor detects, using the communication circuit, that a user is in a predetermined state.

8. The electronic apparatus according to claim 7, wherein the predetermined state comprises a state where a value which indicates a biological information of a user detected by the another electronic apparatus does not fall within a predetermined value.

9. The electronic apparatus according to claim 7, wherein the predetermined processing comprises a processing of giving notice outside that a user is in a dangerous state.

10. A control method that is executed by an electronic apparatus comprising a display configured to change a brightness of the display, a water detection circuit configured to detect water, and a communication circuit configured to be able to communicate with another electronic apparatus, the control method comprising:
    detecting, using the water detection circuit, that at least part of the electronic apparatus is located in the water and detecting, using the communication circuit, that the another electronic apparatus is not located in the water;
    brightening the display compared with that when it is detected that the at least the part of the electronic apparatus is located in the water and detecting, using the communication circuit, at least part of the another electronic apparatus is located in the water; and
    determining a water depth of the display, wherein when the display comprises a first part that is submerged in the water and a second part that is not submerged in the water the brightness of the first part is changed but the brightness of the second part is not changed.

11. A non-transitory computer readable recording medium that stores a control program for causing an electronic apparatus comprising a display configured to be able to change brightness of the display, a water detection circuit configured to detect water, and a communication circuit configured to be able to communicate with another electronic apparatus, to execute:
    detecting, using the water detection circuit, that at least part of the electronic apparatus is located in the water and detecting, using the communication circuit, that the another electronic apparatus is not located in the water;
    brightening the display compared with that when it is detected that the at least the part of the electronic apparatus is located in the water and detecting, using the communication circuit, at least part of the another electronic apparatus is located in the water; and determining a water depth of the display, wherein when the display comprises a first part that is submerged in the water and a second part that is not submerged in the water the brightness of the first part is changed but the brightness of the second part is not changed.

* * * * *